United States Patent [19]

Vaughan

[11] 3,755,329

[45] Aug. 28, 1973

[54] NITROGEN-HETEROCYCLYLGOLD(I) COMPOUNDS

[75] Inventor: Lawrence Graham Vaughan, Wilmington, Del.

[73] Assignee: E. I. du Pont de Nemours and Company, Wilmington, Del.

[22] Filed: Dec. 22, 1970

[21] Appl. No.: 100,797

Related U.S. Application Data

[63] Continuation-in-part of Ser. No. 715,960, March 26, 1968, abandoned.

[52] U.S. Cl. ............ 260/270 R, 117/107.2, 260/242, 260/279 R, 260/286 A, 260/288 P, 260/289 R, 260/297, 260/299, 260/430, 260/441, 260/446
[51] Int. Cl. .............................................. C07f 1/12
[58] Field of Search ................................ 260/270 R

[56] References Cited
UNITED STATES PATENTS

| | | | |
|---|---|---|---|
| 2,597,856 | 5/1952 | Damschroder | 260/270 X |
| 2,597,915 | 5/1952 | Yutzy et al. | 260/270 X |
| 2,340,771 | 1/1949 | Rothmann | 260/270 R |
| 3,657,296 | 4/1972 | Vaughan | 260/270 R |
| 3,661,959 | 5/1972 | Vaughan | 260/270 R |

OTHER PUBLICATIONS

Vaughan et al., Jour. Am. Chem. Soc., Vol. 91, p. 6151 (1959).
Karasch et al., Jour. Am. Chem. Soc., Vol. 52, p. 2919–2927 (1930).
Karasch et al., Jour. Am. Chem. Soc., Vol. 53, p. 3053–3059 (1931).

*Primary Examiner*—Donald G. Daus
*Attorney*—James H. Ryan

[57] ABSTRACT

Disclosed herein are nitrogen-heterocyclylgold(I) compounds wherein the gold is bonded directly, or via a p-phenylene group, to carbon of the heterocyclic nucleus, and a process for their preparation comprising reacting a heterocyclyllithium compound with a trihydrocarbyl-phosphorus, -arsenic, or -antimony-gold halide. The compounds are useful for gold plating and for printing electrical circuits.

22 Claims, No Drawings

NITROGEN-HETEROCYCLYLGOLD(I) COMPOUNDS

CROSS-REFERENCE TO RELATED APPLICATION

This application is a continuation-in-part of copending application, Ser. No. 715,960, filed Mar. 26, 1968, now abandoned.

BACKGROUND OF THE INVENTION

1. Field of the Invention

This invention relates to novel gold(I) compounds having gold(I) bonded directly or through a p-phenylene group to carbon of a nitrogen-heterocyclyl group.

2. Description of the Prior Art

Kharasch and Isbell, J. Am. Chem. Soc., 52, 2919 (1930), disclose pyridinegold(I) chloride in which the pyridine is attached to gold through its nitrogen atoms, not through a carbon. Also disclosed are reactions of gold(I) carbonyl chloride with a number of aryl-, alkaryl-, and aralkylmagnesium halides. None of the novel nitrogen-heterocyclylgold compounds is suggested by any of the teaching in this article.

The same authors, Kharasch and Isbell, in J. Am. Chem. Soc., 53, 3053 (1931), disclose a number of arylgold(III) dichlorides in no way analogous to the novel compounds herein.

SUMMARY OF THE INVENTION

The novel compounds of this invention have the formula

wherein:

Q is a substituted or unsubstituted monovalent radical derived by removal of a hydrogen from a ring carbon of a basic aromatic compound containing one intracyclic nitrogen atom, in which compound any nitrogen atom is tertiary. Q has up to 13 intracyclic carbon atoms and from 0 to 3 substituents, preferably 0 to 1 substituent, selected from the group trifluoromethyl, hydrocarbyl, and hydrocarbyloxy, the hydrocarbyl portions of any such substituents having from one to eight carbon atoms and being free of ethylenic or acetylenic unsaturation; and Y is a link between Q, as defined above, and gold, and is a single bond or a biradical of an aromatic compound such as p-phenylene.

Any nitrogen atoms in Q monovalent radical are tertiary by virtue of being singly bonded to one ring atom and doubly bonded to another ring atom, as in pyridine. The term "heterocyclyl" employed herein defines a group derived by removal of a hydrogen from a ring atom of a heterocyclic compound.

This invention also concerns a method for making the novel compounds by reacting a compound having the formula:

with a compound having the formula:

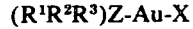

wherein:

Z is selected from the group consisting of phosphorus, arsenic and antimony;

R¹, R² and R³ are hydrocarbyl groups having from 1–18 carbon atoms and are free of ethylenic or acetylenic unsaturation; and X is chlorine, bromine or iodine.

DETAILS OF THE INVENTION

The compounds of the present invention may be present in associated form, either in solution or in the solid phase. For example, x-ray analysis of the 2-pyridylgold(I) compound indicates that this compound is associated in the solid state as a trimer.

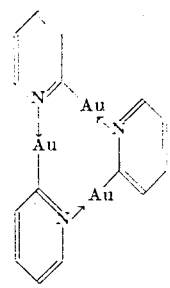

Ebullioscopic measurements in pyridine and cryoscopic measurements in dimethyl sulfoxide indicate that the average degree of association of the compound in these solvents is between two and three.

In accordance with established chemical practice, however, the compounds of the present invention are represented by the monomeric formula, and it is to be understood that such formulae are intended to include associated forms.

The compounds of the present invention are generally prepared in the presence of an inert solvent for the reactants. Ethers such as methyl ether, ethyl ether, tetrahydrofuran, dioxane, trioxane, lower alkyl ethers of glycols and lower alkyl ethers of lower polymers of glycols are preferred as solvents. However, tertiary amines such as trimethylamine, dimethylaniline and pyridine, hydrocarbon solvents such as hexane, decane, cyclohexane, tetrahydronaphthalene, decahydronaphthalene, benzene, toluene, xylenes and halogenated hydrocarbon solvents such as chlorobenzene can also be used. Other organic solvents free of Zerewitinoff-active hydrogen can also be employed. See, regarding Zerewitinoff-active hydrogen: "The Condensed Chemical Dictionary", Ed. 4, p. 713 (Reinhold, 1950).

The temperature of the reaction can be in the range between about −80°C. to about +50°C., preferably between −60°C. and 30°C. A particularly convenient procedure is to start the reaction at about −50°C. (the temperature at which the reactants are generally prepared) and allow the reaction mixture to warm gradually to room temperature.

The pressure at which the reaction is conducted is not critical and can be atmospheric, subatmospheric or superatmospheric.

The reactant, Q-Y-Li, can be made in solution by reacting appropriate bromo- or iodo-Y-Q compounds with an alkyllithium such as butyllithium. The lithium compounds can be made in solution in the selected solvent and need not be isolated.

Suitable starting materials for making the lithium compounds include:

2-bromo-3-methylpyridine
2-bromo-4-methylpyridine 2-bromo-5-methylpyridine
2-bromo-6-methylpyridine
2-bromo-4-sec-butylpyridine
2-bromo-4-ethylpyridine
2-bromo-5-butylpyridine
2-bromo-4-propylpyridine
2-bromo-4,6-dimethylpyridine
2-bromo-4-methoxypyridine
2-bromo-3-(2-ethylhexyloxy)pyridine
2-bromo-3-(t-butoxypyridine)
2-bromo-3-phenoxypyridine
2-bromo-5-propoxypyridine
2-bromo-4-phenylpyridine
2-bromo-3,4,6-triphenylpyridine
2-bromoquinoline
2-bromo-4-methylquinoline
2-bromo-8-methylquinoline
2-bromo-8-phenylquinoline
2-bromo-3,4-dimethylquinoline
2-bromo-4,6-dimethylquinoline
2-bromo-4,7-dimethylquinoline
8-bromo-2-methylquinoline
8-bromo-6-methylquinoline
8-bromo-2,6-dimethylquinoline
8-bromo-6-methoxyquinoline
8-bromo-5-(n-butoxyquinoline)
6-bromophenanthridine
6-bromo-2-ethoxyphenanthridine
1-, 2-, 3-, 4-, and 9-bromoacridine
6-bromo-2-ethoxy-9-phenoxyacridine
3-bromo-6-methoxy-9-phenoxyacridine
9-(p-bromophenyl)acridine
2-bromo-9-phenylacridine
6-bromo-1,2-dimethylbenzimidazole
2-(p-bromophenyl)-1-methylbenzimidazole
1-, 3-, 4-, and 5-bromoisoquinoline
4-bromo-1-ethoxyisoquinoline
4-bromo-1-ethylisoquinoline
3-bromo-5-methylisoquinoline
3-, 4-, and 5-bromo-1,10-phenanthroline
4-bromo-3-phenyl-1,10-phenanthroline
3- and 4-bromopyridine
3-bromo-5-methoxypyridine
4-bromo-2-ethylpyridine
4-bromo-2-methoxypyridine
3-(p-bromophenyl)pyridine
5-bromo-2-ethoxypyridine
3-iodo-4-phenoxypyridine
3-iodo-2,4,6-trimethylpyridine
3-, 4-, 5-, 6-, and 7-bromoquinoline
6-bromo-2-heptylquinoline
5-bromo-8-methoxyquinoline
7-bromo-6-methoxyquinoline
4-bromo-6-methylquinoline
3-bromo-2-phenylquinoline
5-bromo-8-propoxyquinoline
3-bromo-2,5-dimethylquinoline
3-bromo-6,8-dimethylquinoline
6-bromo-2-isobutylquinoline
6-bromo-2-pentylquinoline
4-bromo-2-phenylquinoline
7-(p-bromophenyl)quinoline
6-bromo-2-(2,5-xylyl)quinoline
8-iodo-5-trifluoromethylquinoline
8-iodo-7-trifluoromethylquinoline The foregoing reactants include compounds in which a bromo or iodo group is bonded directly to a ring carbon of the Q group as well as compounds in which a p-bromophenyl group is bonded to such a carbon. When the latter type is used, a product of the invention in which Y is p-phenylene is formed. Other p-bromophenyl-containing starting materials can be made by reacting a parent QH compound, e.g., pyridine, with p-bromophenyllithium, treating the addition product with water, and dehydrogenating the resulting product with nitrobenzene. Other methods of preparing these compounds will be apparent to those skilled in the art.

If any of the bromo or iodo compounds described above is used as a starting material in the process of the invention, there will be formed a product of the invention in which the bromo or iodo group is replaced by a gold atom. To illustrate (see Example 3), from 2-bromo-3-methylpyridine there is formed 3-methyl-2-pyridylgold(I).

Examples of some heterocyclic ring systems, QH, from which Q groups are derived, are pyridine
quinoline
benzoquinoline
isoquinoline
benzisoquinoline
acridine
phenanthridine
phenanthroline Q will contain one heterocyclic ring, to carbon-carbon bonds of which may be fused one or two benzene rings. Accordingly, the term "benzoquinoline" includes acridine and phenanthridine.

When Y is a biradical such as p-phenylene Q is preferably derived from acridine, pyridine or quinoline. When Q is a pyridyl or substituted pyridyl group, it is preferably bonded through the 2-carbon, since the intermediate pyridyllithium compounds are relatively easy to prepare.

Preferably no heterocyclic ring in Q has more than one trifluoromethyl substituent or more than one tertiary alkyl substituent. The preferred hydrocarbyl portions of any substituents are lower alkyl or phenyl. Most preferably any substituents are lower alkyl of one to six carbons. Products containing a tertiary alkyl substituent are of special interest because of their relatively high solubility in organic solvents.

The compounds of the general formula $R^1R^2R^3Z$-Au-X which are reacted with Q-Y-Li to form the novel compounds can have $R^1$, $R^2$ and $R^3$ as hydrocarbyl groups free of ethylenic or acetylenic unsaturation. Preferably $R^1$, $R^2$ and $R^3$ are aryl or alkaryl groups having from six to 12 carbon atoms. Examples of such compounds are:

triphenylphosphinegold chloride
tritolylphosphinegold chloride
tri-2,5-xylylphosphinegold chloride
tris(2,4,6-trimethylphenyl)phosphinegold chloride
phenyldi-p-tolylphosphinegold chloride
diphenyl-p-tolylphosphinegold chloride
tri-1-naphthylphosphinegold chloride
tris(biphenylyl)phosphinegold chloride
triphenylarsinegold chloride
tri-p-tolylarsinegold chloride
di-o-tolylphenylarsinegold chloride
tri-2,5-xylylarsinegold chloride
tri-m-tolylstibinegold chloride
tri-3,5-xylylstibinegold chloride
bis(2-biphenylyl)-p-tolylstibinegold chloride tri-2-naphthylstibinegold chloride
2-biphenylylphenyl-p-tolylstibenegold chloride $R^1$, $R^2$ and $R^3$ are also preferred to be lower alkyl groups of up to six carbons. Examples of such starting materials include:
triethylphosphine
triisopropylphosphine
tris(s-butyl)phosphine
trihexylphosphine
dimethylethylphosphine
diethylisopropylphosphine
ethylisopropylisobutylphosphine
triethylarsine
trimethylstibine.

It will also be realized that $R^1$ and $R^2$ can be jointly a polyalkylene diradical of from four to six carbon atoms.

SPECIFIC EMBODIMENTS

This invention is further illustrated by the following preparations and specific numbered examples, which should not, however, be construed as limiting the scope of this discovery.

PREPARATION OF CHLORO(TRIPHENYLARSINE)GOLD(I) REACTANT

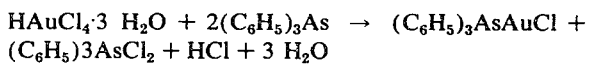

A solution of 28.0 g. (71 mmoles) of chloroauric acid in 250 ml. of methanol was cooled to 0°C. A solution of 44.0 g. (144.0 mmoles) of triphenylarsine in 100 ml. of chloroform was added dropwise with stirring over about 30 minutes. The precipitated product was dissolved by adding an additional 150 ml. of chloroform to the solution and heating it to reflux. The hot solution was filtered and on cooling, 27.9 g. product was obtained, m.p. 210°–211°C. dec. An analytical sample was recrystallized a second time from a mixture of methanol and chloroform.

Anal. Calc'd. for $C_{18}H_{15}AsAuCl$: C, 40.14; H, 2.81; Au, 36.57

Found: C, 40.27; H, 2.89; Au, 36.65

The volume of the filtrate was then evaporated by one-third by heating and, on cooling, an additional 8.0 g. of crystalline product formed, m.p. 211°–213°C. dec. The volume of the filtrate was then reduced to one-half its former volume by boiling and, on cooling, a final 2.0 g. product formed, m.p. 212°–214°C. dec. Total yield of product was 37.9 g. (99.2 percent).

PREPARATION OF CHLORO(TRIPHENYLSTIBINE)GOLD(I) REACTANT

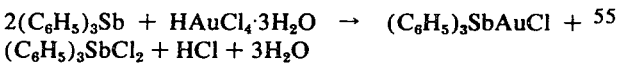

To a solution of 4.0 g. (10.1 mmoles) of chloroauric acid in 50 ml. of ethanol at 0°C. was added dropwise a solution of 7.2 g. (20.4 mmoles) of triphenylstibine in 20 ml. of chloroform. The solution had a slight yellow color at the end of this addition, so an additional 0.1 g. (0.283 mmoles) of triphenylstibine in 5 ml. of chloroform was added. The precipitated solid was then filtered and dissolved in 250 ml. of boiling ethanol. The ethanol solution was then filtered to remove decomposition products and kept at 0°C. for 4 days. A total of 3.6 g. (61 percent yield) of crystals was obtained. The sample began to darken at 100°C., then melted with decomposition between 132°C. and 135°C.

Anal. Calc'd. for $C_{18}H_{15}AuClSb$: C, 36.92; H, 2.58; Au, 33.64

Found: C, 36.83; H, 2.58, Au, 34.57.

EXAMPLE 1

Preparation of 2-Pyridylgold(I)

To 8 ml. of a butyllithium solution of hexane containing 0.815 g. of butyllithium (12.5 mmoles) at −65°C. was added 20 ml. of tetrahydrofuran over a 15-minute period. A solution of 2.0 g. (12.6 mmoles) of 2-bromopyridine in 15 ml. of tetrahydrofuran was then added to the solution over a 5-minute period. The mixture was stirred at −65°C. for an additional 5 minutes, then 4.5 g. (8.35 mmoles) of chloro-(triphenylarsine)-gold(I) was added in one batch. The mixture was stirred at room temperature for 2 hours, then 1.0 g. (9.2 mmoles) of trimethylchlorosilane was added to react with excess lithium reagent. The mixture was then filtered through a sintered glass filter and the solid on the filter was dried at room temperature and about 0.1 mm. to give 2.0 g. (87 percent yield) of crude 2-pyridylgold(I). After recrystallization from pyridine, an analytical sample began to darken at 120°C. and melted with decomposition at 150°C.

Anal. Calc'd. for $C_5H_4AuN$: C, 21.83; H, 1.47; Au, 71.61; N, 5.09

Found: C, 22.07; H, 1.34; Au, 71.34; N, 4.97.

A M.W. weight determination of this sample (ebullioscopic in pyridine) gave a value of 565 (calculated for dimer 550; calculated for trimer 825).

A single crystal X-ray study on this sample of 2-pyridylgold gave the following results: orthorhombic, $a = 17.463$, $b = 18.992$, $c = 9.229$; Pmma, Pm2a, Pm2$_1$a.

EXAMPLE 2

Preparation of 2-Pyridylgold(I)

To a solution of 2.03 g. (31.8 mmoles) of butyllithium in 40 ml. of ether at −50°C. was added dropwise a solution of 5.0 g. (31.7 mmoles) of 2-bromopyridine in 40 ml. of ether. When the addition was complete, 10.0 g. (18.6 mmoles) of solid chloro(triphenylarsine)-gold(I) was added in one batch. Most of the solid dissolved within 5 minutes, and the solution was allowed to warm to room temperature over a 1-hour period. Excess water (about 5–10 ml.) was added dropwise with stirring. A yellow-green solid precipitated from the solution. This solid was collected on a sintered glass filter and washed with 100 ml. of water followed by 100 ml. of ether, and dried. The yield of 2-pyridylgold(I) was 7.4 g. The crude product was recrystallized twice from pyridine, furnishing yellow crystals which developed a dark green color at about 100°C. and melted with decomposition at 143°C.

Analysis indicated that the product contained about one molecule of pyridine for every three molecules of trimeric 2-pyridylgold(I). A molecular weight determination (cryoscopic in dimethylsulfoxide gave a value of 660. Calc'd. for $(C_5H_4NAu)_3 1/3(C_5H_5N)$: 638.5.

Anal. Calc'd. for $C_{50}H_{41}Au_9N_{10}$:
C, 23.50; H, 162; Au, 69.40; N, 5.48
Found: C, 23.68, 23.64; H, 1.54, 1.81;
Au, 69.50, 68.86; N, 5.45, 5.37.

The product can also be obtained by substituting chloro(triphenylphosphine)gold(I) or chloro(triphenylstibine)gold(I) for chloro(triphenylarsine)gold(I) in the process of this example.

EXAMPLE 3

Preparation of 3-Methyl-2-pyridylgold(I)

3-Methyl-2-pyridyllithium was prepared at −50°C. by the addition of a solution of 3.3 g. (19.2 mmoles) of 2-bromo-3-methylpyridine in 15 ml. of ether to a solution of 19.3 mmoles of butyllithium in a mixture of 12 ml. of hexane and 15 ml. of ether. To this solution was then added 8.0 g. (14.9 mmoles) of chloro(triphenylarsine)gold in one batch. A yellow solid slowly precipitated as the solution warmed to room temperature. After the mixture was stirred for 2 hours at room temperature, 1.6 g. (14.7 mmoles) of chlorotrimethylsilane was added to react with the excess lithium reagent. The solid was separated by filtration, washed with a little ether, and air-dried, to give 4.2 g. of crude 3-methyl-2-pyridylgold(I) (98.8 percent yield). An analytical sample was recrystallized from pyridine, furnishing bright-yellow crystals. When heated, the sample gradually turned green between 160°–190°C. A slight decomposition was observed starting at 200°C., and the bulk of the sample melted with decomposition at 217°–220°C.

Anal. Calc'd for $C_6H_6AuN$: C, 24.92; H, 2.09; Au, 68.14; N, 4.85

Found: C, 25.01; H, 2.30; Au, 67.86; N, 5.17.

EXAMPLE 4

Preparation of 4-Methyl-2-pyridylgold(I)

To a solution of 35 ml. of ether and 18 ml. of hexane containing 1.86 g. butyllithium (29 mmoles) at −45°C. was added an ether solution of 5.0 g. (29 mmoles) of 2-bromo-4-methylpyridine. To the solution was then added 10.0 g. (18.6 mmoles) of chloro(triphenylarsine)gold(I). The solid gradually dissolved as the solution was allowed to warm to room temperature. The mixture was stirred at room temperature for 2 hours and then hydrolyzed with excess water as in Example 2. The pale green solid which formed was washed first with 100 ml. of water and then with 100 ml. of ether. After drying for 2 hours in a vacuum, 6.9 g. of crude 4-methyl-2-pyridylgold(I) was obtained. The solid was only sparingly soluble in pyridine but could be recrystallized from a large volume of the solvent to give white crystals of m.p. 184°C. dec.

Anal. Calc'd. for $C_6H_6AuN$: C, 24.92; H, 2.09; Au, 68.14; N, 4.85

Calc'd. for $C_{59}H_{59}Au_9N_{10}$:
C, 26.43; H, 2.22; Au, 66.13; N, 5.22

Found: C, 25.95; H, 2.50; Au, 67.53; N, 5.20.

EXAMPLE 5

Preparation of 5-Methyl-2-pyridylgold(I)

To 30 ml. of ether was added 18.2 ml. of hexane solution containing 1.86 g. (29 mmoles) of butyllithium. The solution was cooled to −50°C., and a solution of 5.0 g. (29 mmoles) of 5-methyl-2-bromopyridine in 25 ml. of ether was added over a 10-minute period. The solution was stirred at −50°C. for an additiomal 5 minutes, then 10.0 g. (18.6 mmoles) of chloro(triphenylarsine)gold(I) was added in one batch. The mixture was stirred and allowed to warm to room temperature over a 1-hr. period and then stirred at room temperature for 2 hours. During hydrolysis with excess water as in Example 2, a pale green solid precipitated. The solid was collected on a sintered glass filter, washed with ether and placed in a drying pistol at room temperature and about 0.1 mm. for 6 days. A total of 5.8 g. of crude 5-methyl-2-pyridylgold(I) [(5.37 theoretical)] was obtained. It was only sparingly soluble in all common organic solvents, but a small quantity was recrystallized from a large volume of morpholine. On heating, the analytical sample became gray at 140°C. and decomposed to furnish metallic gold at 159°C.

Anal. Calc'd. for $C_6H_6AuN$: C, 24.92; H, 2.09; Au, 68.14; N, 4.85

Found: C, 25.19; H, 2.59; Au, 67.94; N, 4.93.

The crude product was also recrystallized from a large volume of tetrahydrofuran, furnishing a sample which turned gray at 135°C. and decomposed to give metallic gold at 155°C.

EXAMPLE 6

Preparation of 6-Methyl-2-pyridylgold(I)

A solution of 19.3 mmoles butyllithium in 12 ml. of hexane and 15 ml. of ether was cooled to −50°C. A solution of 3.3 g. 2-bromo-6-methyl pyridine in 20 ml. of ether was then added over a 10-minute period. After the solution was stirred for an additional 5 minutes at −50°C., 8.0 g. (14.9 mmoles) of chloro(triphenylarsine)gold was added in one batch. Most of the solid had dissolved when the temperature reached −15°C., and at −10°C. a tan product began to precipitate. The mixture was stirred at room temperature for 2 hours and then 1.6 g. (14.7 mmoles) of trimethylchlorosilane was added to react with the excess lithium reagent. The mixture was then filtered and the solid on the filter was dried at room temperature and about 0.1 mm. to give 4.0 g. (93 percent) of crude 6-methyl-2-pyridylgold(I). A sample recrystallized from pyridine darkened at 140°C., then melted with decomposition at 169°–171°C.

Anal. Calc'd. for $C_6H_6AuN$: C, 24.92; H, 2.09; Au, 68.14 N, 4.85

Found: C, 24.55; H, 1.94; Au, 68.56; N, 4.86.

EXAMPLE 7

A. Preparation of 2-Quinolylgold(I)

In a 250-ml. flask was placed 30 ml. of ether and 18.2 ml. of hexane solution containing 1.86 g. of butyllithium (29 mmoles). The solution was cooled to −50°C., and a solution of 6.02 g. (29 mmoles) of 2-bromoquinoline in 30 ml. of ether was added dropwise over a 10-minute period. The solution was stirred for an additional 5 minutes, and 10.0 g. (18.6 mmoles) of chloro(triphenylarsine)gold(I) was added in one batch. The solution was allowed to warm to room temperature over a 1-hour period. When the solution temperature reached −10°C., all solid had dissolved. A yellow-green solid began to precipitate at −5°C. The mixture was stirred at room temperature for 2 hours, then hydrolyzed with excess water as in Example 2. The tan precipitated solid was collected on a sintered glass filter and washed first with water, then with ether. After drying 3 hours in a pistol at room temperature and about 0.1 mm., 10.6 g. crude product was obtained.

Anal. Calc'd for $C_9H_6AuN$: C, 33,24; H, 1.86; N, 4.31

Found: C, 32.17; H, 1.84; N, 4.32.

B. Purification of 2-Quinolylgold(I)

A suspension of 2.0 g. (6.15 mmoles) of crude 2-quinolylgold was prepared in 25 ml. of tetrahydrofuran, and 0.5 g. (6.6 mmoles) of trimethylphosphine was added in one batch. Much of the solid seemed to dissolve immediately. The solution was stirred for 20 minutes and then filtered. After being stirred about 30 minutes with activated charcoal, the solution was filtered a second time, and the tetrahydrofuran was removed under vacuum. A solid, filmy residue remained which was dissolved in benzene, treated with activated charcoal, and filtered. The solution was then placed in the cold room for 2 days, but no crystals precipitated. The benzene was then removed under vacuum, and a portion of the residue was dissolved in deuterochloroform for a nmr spectrum. The spectrum showed that a 2-quinolylgold(I)-trimethylphosphine complex had been formed. On standing for about 2 days, 2-quinolylgold(I) slowly precipitated as a crystalline solid as the complex dissociated and trimethylphosphine was liberated. The gold compound was separated by filtration and dried.

Anal. Calc'd. for $C_9H_6AuN$: C, 33.24; H, 1.86; Au, 60.59; N, 4.31

Found: C, 33.55; H, 2.22; Au, 57.55; N, 4.21.

On heating, this sample changed from yellow to gray between 200°C. and 210°C., then melted with decomposition between 210°C. and 215°C. On longer standing, more yellow crystals precipitated from the solution.

Anal. Found: C, 33.14; H, 1.88; Au, 59.29; N, 4.12. On heating, the sample darkened between 135°C. and 140°C. and decomposed between 193°C. and 210°C.

EXAMPLE 8

Preparation of 8-Quinolylgold(I)

A solution of 4.47 g. (21 mmoles) of 8-bromoquinoline and 25 ml. of ether was cooled to −55°C. To this solution was added dropwise over a 10-minute period 13.5 ml. of a hexane solution containing 1.38 g. (21.5 mmoles) of n-butyllithium. The solution was stirred for 10 minutes at −55°C., then 10.0 g. (18.6 mmoles) of chloro(triphenylarsine)gold(I) was added in one batch. The solution was then added 1.0 g. (9.2 mmoles) of trimethylchlorosilane to react with the excess lithium reagent. The solution was then filtered to collect the precipitated orange-red solid. After drying, 8.0 g. of crude 8-quinolylgold(I) was obtained.

Anal. Calc'd. for $C_9H_6AuN$: C, 33.24; H, 1.86; N, 4.31

Found: C, 33.17, 33.09; H, 2.45, 2.86; N, 4.29.

This solid was stirred for 20 minutes with 50 ml. of dichloromethane, the mixture was filtered, and the solid was dried. It was recrystallized twice from dimethyl sulfoxide to give 8-quinolylgold(I), m.p. 268°–271°C. with decomposition.

Anal. Calc'd. for $C_9H_6AuN$: C, 33.24; H, 1.86; Au, 60.59; N, 4.31

Found: C, 32.64; H, 1.88; Au, 60.23; N, 4.02.

Similar results are obtained if trimethylphosphinegold(I) chloride is employed in place of the chlorotriphenylarsinegold(I) reagent.

EXAMPLE 9

Preparation of 4-t-Butylpyridylgold(I)

To a solution of 5.0 g. (23.4 mmoles) 2-bromo-4-t-butylpyridine in 35 ml. of ethyl ether at −50°C. was added, dropwise with stirring, 23.4 mmoles of butyllithium in 15 ml. of hexane. The mixture was stirred for 10 minutes and then 10.6 g. (19.7 mmoles) of chloro(triphenylarsine)gold(I) was added in one batch. The mixture was stirred and allowed to warm to room temperature. A tan solid began to precipitate at 0°C. The mixture was refluxed for one-half hour, then hydrolyzed with excess water. The crude 4-t-butyl-2-pyridylgold(I) weighed 3.0 g. (46 percent yield). An analytical sample was recrystallized from 75 ml. of cyclohexane, m.p. 182°–185°C. dec.

Anal. Calc'd. for $C_9H_{12}AuN$: C, 32.64; H, 3.65; Au, 59.48; N, 4.23

Found: C, 33.13; H, 3.73; Au, 58.87; N, 4.07. In the nmr spectrum of this product ($CDCl_3$ solution) a doublet (J = 5.5 cps) occurred at 7.99 ppm, a doublet (J = 2.0 cps) at 7.49 ppm, a doublet (J = 5.5 cps) further split into a second doublet (J = 2.0 cps) at 6.78 ppm and a sharp singlet at 1.30 ppm. These peaks were in the expected ratio of 1:1:1:9.

The product of the foregoing example was decomposed at 200°C. under reduced pressure to give the corresponding bipyridyl and gold powder.

EXAMPLE 10

Preparation of 6-Methoxy-8-Quinolylgold

To a solution of 5.0 g. (21.0 mmoles) of 6-methoxy-8-bromoquinoline in 35 ml. of tetrahydrofuran at −60°C. was added dropwise 21.0 mmoles butyllithium in 13.2 ml. of hexane. To this mixture was then added 9.0 g. (16.7 mmoles) of chloro(triphenylarsine)gold(I) in one batch. The solution was stirred and allowed to warm to room temperature. At about 10°C. an orange solid began to precipitate. The mixture was stirred for two hours at room temperature and then filtered, furnishing 5.55 g. (93.5 percent yield) of yellow 6-methoxy-8-quinolylgold(I). A 0.5 g. sample was recrystallized from 30 ml. of dimethyl sulfoxide. The analytical product obtained began to darken at 235°C. and decomposed rapidly at 270°C.

Anal. Calc'd. for $C_{10}H_8AuNO$: C, 33.81; H, 2.27; Au, 55.46; N, 3.95

Found: C, 33.70; H, 2.57; Au, 55.20; N, 3.83.

The product of the foregoing example was decomposed at 275°C. and 0.2 mm to give the corresponding biquinolyl and gold powder.

EXAMPLE 11

Preparation of 4-(2-quinolyl)phenylgold(I)

1-Bromo-4-(2-quinolyl)benzene was prepared by reacting quinoline with p-bromophenyllithium, treating the product with water, and dehydrogenating the resulting 2-(4-bromophenyl)-1,2-dihydroquinoline with nitrobenzene. A solution of 3.0 grams (10.6 mmoles) of 1-bromo-4-(2-quinolyl)benzene in 20 ml. of tetrahydrofuran was cooled to −40°C., and 10.6 mmoles of butyllithium in 6.6 ml. of hexane was added dropwise with stirring. To the resulting solution was added 5.4 grams (10.0 mmoles) of chloro(triphenylarsine)gold(I) in one portion. The mixture was allowed to warm to room temperatUre with stirring, stirred for 2 hours at room temperature, and refluxed one hour. The solid 4-(2-quinolyl)phenylgold(I) was collected on a filter and dried. The product was insoluble in several polar organic solvents. On heating, it slowly darkened and then melted with decomposition at 324°C.

Anal. Calcd. for $C_{15}H_{10}AuN$: C, 44.90; H, 2.51; Au, 49.10; N, 3.49

Found:C, 43,51; H, 2.74; Au, 48.79; N, 3.15.

The product of this example was decomposed at 325°–350°C./0.1 mm. to give 4,4'-bis(2-quinolyl)biphenyl and gold powder.

EXAMPLE 12

Preparation of 4,6-Dimethyl-2-pyridylgold(I)

Using the procedure of Example 4, 4,6-dimethyl-2-pyridylgold(I) was prepared from 4,6-dimethyl-2-pyridyllithium and chloro(triphenylarsine)-gold(I). A quantitative yield of crude product was obtained. After recrystallization from pyridine, the product began to darken at 150°C. and decomposed without melting between 185°C. and 190°C. to give metallic gold and 4,4''-tetramethyl-2,2'-bipyridyl.

Anal. Calc'd for $C_7H_8AuN$: C, 27.73; H, 2.66; Au, 64.99; N, 4.62

Found: C, 28.19; H, 2.76; Au, 64.96; N, 4.65.

EXAMPLE 13

A. Preparation of 6-Phenanthridinylgold(I)

By the method of Example 1, except that an equivalent amount of 6-bromophenanthridine was used in place of 2-bromopyridine, 6-phenanthridinylgold(I) was prepared and obtained as a crude solid in 89.5 percent yield.

B. Purification of 6-Phenanthridinylgold(I)

Crude 6-phenanthridinylgold(I) (1.0 g.) was suspended in 30 ml. of tetrahydrofuran and 0.40 g. of trimethylphosphine was added. The mixture was stirred for two hours, during which time most of the solid dissolved. It was filtered to remove undissolved solid, and the tetrahydrofuran was evaporated from the filtrate under reduced pressure. The residue was taken up in 15 ml. of ethyl alcohol, the mixture was filtered, and the filtrate was allowed to stand for 4 days. During this time 6-phenanthridinylgold(I) precipitated as an orange crystalline solid. It was separated by filtration and dried. On heating, it began to darken at about 275°C., became black at about 300°C., and melted with decomposition at 345°C.

Anal. Calc'd. for $C_{13}H_8AuN$:

C, 41.61; H, 2.15; Au, 52.50; N, 3.74

Found: C, 41.54; H, 2.02; Au, 49.00; N, 3.61.

More of the product precipitated when the filtrate was allowed to stand for several more days. It behaved as described above on heating and gave the following analysis:

Found: C, 42.06; H, 2.06; Au, 50.96; N, 3.57.

EXAMPLE 14

Preparation of 5-trifluoromethyl-2-pyridylgold(I)

To a solution of 30.0 mmoles of butyllithium in a mixture of 19 ml. of hexane and 25 ml. of ether at −55°C. was added dropwise a solution of 6.8 g. (30.0 mmoles) of 2-bromo-5-trifluoromethylpyridine in 25 ml. of ether. The solution was stirred for 5 minutes and 12.0 g. (22.3 mmoles) of $(C_6H_5)_3AsAuCl$ was added in one batch. The mixture was allowed to warm to room temperature over 1 hour and then heated at 40°C. for one-half hour. After hydrolysis with water as in Example 2, the product was collected on a sintered glass filter and washed three times with 50 ml. portions of $CH_2Cl_2$. The yield of crude 5-trifluoromethyl-2-pyridylgold(I) was 2.8 g. (36 percent). For analysis, a 1.0 g. sample was recrystallized from 250 ml. of boiling pyridine. It was orange, darkened at about 185°C., and decomposed at 195°–200°C.

Anal. Calcd, for $C_6H_3AuF_3N$:

C, 21.01; H, 0.88; Au, 57.42; N, 4.08

Found: C, 19.79; N, 0.92; Au, 57.45; N, 3.92.

On being heated at 380°C. and 20 mm., the product decomposed to give 5,5'-bis(trifluoromethyl)-2,2'-bipyridyl, which sublimed, and metallic gold.

EXAMPLE 15

Preparation of 2-methyl-4-quinolygold(I)

To a solution of 6.65 g. (30.0 mmoles) of 2-methyl-4-bromoquinoline in 60 ml. of ether at −60°C. was added dropwise 30.0 mmoles of butyllithium in 18.8 ml. of hexane. The 2-methyl-4-quinolyllithium separated as a red solid. The mixture was stirred for five minutes at −60°C. and then 12.0 g. (22.3 mmoles) of $(C_6H_5)_3AsAuCl$ was added in one batch. After the mixture had warmed to room temperature, it was refluxed for 1 hour and then hydrolyzed with excess water as in Example 2. The solid was separated by filtration, washed with three 30-ml. portions of acetone and with two 30-ml. portions of methylene chloride, and dried. The yield of crude 2-methyl-4-quinolygold(I) was 7.55 g. (100 percent). An analytical sample, after recrystallization from pyridine, had m.p. 215°–218°C. dec. It was bright yellow.

Anal. Calcd. for $C_{10}H_8AuN$: C, 35.41; H, 2.38; Au, 58.08; N, 4.13

Found: C, 35.37; H, 2.43; Au, 57.34; N, 4.02

EXAMPLE 16

Preparation of 2,4-dimethyl-7-quinolylgold(I)

By essentially the method of Example 9, from 8.0 g. (23.2 mmoles) of 2,4-dimethyl-7-iodo-quinoline and 12.0 g. (22.3 mmoles) of chloro(triphenylarsine)gold there was obtained 8.45 g. of crude purple 2,4-dimethyl-7-quinolylgold(I). When heated, the compound decomposed at 120°–125°C.

On being heated at 230°C. and 0.2 mm., the product decomposed to give 2,2',4,4'-tetramethyl-7,7'-biquinolyl and metallic gold.

UTILITY

When heated to a temperature of about 150°C. to 200°C., the novel compounds decompose to metallic gold, for example according to the following representation:

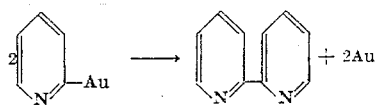

Heating in the absence of a diluent provides the metallic gold in the form of a fine powder. Heating in the presence of an inert diluent such as pyridine and/or dimethyl sulfoxide provides a gold deposit in the form of a coherent film. Thus, the gold compounds of this invention can be suspended in an appropriate diluent to form a printing ink that upon moderate heating will deposit metallic gold upon a substrate. Such inks are useful in the manufacture of printed circuitry and the like, and for forming gold reflective films or coatings.

The gold compounds can be used in liquid gold decorating compositions to produce decorative gold films on any of the conventional substrates such as glass, china, ceramics, and the like. Any of the conventional components of gold decorating compositions, such as described in coassigned U. S. Pat. No 2,490,399, granted to K. H. Ballard, may be used together with the gold compounds of this invention. Therefore, the gold decorating compositions of this invention include, for example, a mixture of pyridylgold, quinolylgold, or phenanthridinylgold compounds dissolved or suspended in a liquid vehicle, with or without the addition of conventional gold decorating components.

The novel gold compounds wherein Y is a single bond, and the gold atom is bonded to a carbon ortho or peri to the intracyclic nitrogen are also useful for making chelating agents such as the bipyridine compound depicted above. The chelating agents are formed by decomposing the novel compounds by heat and then cooling the decomposition products (gold and the aromatic chelating agent), and separating and collecting the chelating agent.

The following examples illustrate the usefulness of various representative novel compounds for depositing gold and for making chelating agents.

EXAMPLE A

Formation of Gold Film From 2-Pyridylgold(I)

A suspension of 100 mg. of 2-pyridylgold(I) in 3 ml. of dimethyl sulfoxide was heated to reflux. The resulting solution first turned purple, and then a brilliant gold film was deposited on the walls of the glass vessel.

EXAMPLE B

Use of 2-Quinolylgold(I) for Gold Plating

Ten mg. of 2-quinolylgold(I) was suspended in 2 ml. of dimethylsulfoxide. On heating to reflux, the solution first turned purple and then a brilliant gold film formed on the walls of the glass vessel.

EXAMPLE C

Preparation of Metallic Gold and 2,2'-Bipyridine From 2-Pyridylgold(I)

When a sample of 2-pyridylgold(I) was heated in a drying pistol at 61°C. (refluxing chloroform) at 0.1 mm., decomposition occurred. Metallic gold was deposited in the sample vial, and crystals of 2,2'-bipyridyl slowly formed in the cool portion of the drying pistol. An infrared spectrum of this sample was identical with that of an authentic sample of 2,2'-bipyridine.

EXAMPLE D

Preparation of Metallic Gold and 4,4'-Dimethyl-2,2'-Bipyridine
From 4-Methyl-2-Pyridylgold(I)

In a sublimator was placed 0.7 g. (2.42 mmoles) of 4-methyl-2-pyridylgold(I). The sample was heated to 200°C. at 0.2 mm. pressure. The sublimate was sublimed a second time, then dissolved in 20 ml. of methanol, treated with activated charcoal, and filtered. The volume of solvent was then reduced to 3 ml., and on cooling, 170 mg. (76 percent yield) of crystals formed, m.p. 177°C. (lit. m.p. 171°–172°C.). In the nmr spectrum of the product (CDCl$_3$), and a sharp doublet occurred at 7.51 ppm (J = 5.0 cycles per second), a broad singlet at 7.24 ppm, a broad doublet at 6.08 ppm (J = 5.0 cycles per second), and a sharp singlet at 1.40 ppm. The intensity ratio of these peaks was 1:1:1:3. The residue from this decomposition was 0.53 g. of metallic gold.

EXAMPLE E

Preparation of Metallic Gold and 6,6'-Dimethyl-2,2'-Bipyridine
From 6-Methyl-2-Pyridylgold(I)

A sample of 1.5 g. 6-methyl-2-pyridylgold (I) was placed in a sublimator and heated to 200°C. at 0.2 mm. pressure. The weight of the sublimate was 0.35 g. (73 percent yield). After recrystallization from petroleum ether, the product had a m.p. 87°–89°C., lit. m.p. 88.5°–89.5°C. The nmr spectrum of the product (CDCl$_3$) was consistent with the expected structure. A doublet (J = 7.0 cps) occurred at 8.23 ppm, a triplet (probably 2 superimposed doublets) (J = 7.0 cps) at 7.62 ppm, a doublet (J = 7.0 cps) at 7.07 ppm, and a sharp singlet at 2.6 ppm. The intensities of these peaks were in the expected ratio of 1:1:1:3.

EXAMPLE F

Preparation of Metallic Gold and 2,2'-Biquinoline From 2-Quinolylgold(I)

In a sublimator was placed 2.0 g. (6.15 mmoles) of crude 2-quinolylgold(I). The sample was then heated under 0.1 mm. pressure, and decomposition was observed to occur starting at 175°C. The sublimate which formed on the cold finger was dissolved in benzene, treated with activated charcoal, filtered, and the benzene then removed under reduced pressure. Sublimation of the residue furnished 0.5 g. (63 percent yield) of 2,2'-biquinoline m.p. 191°C. A sample recrystallized from ethanol had a m.p. 190°–191°C. (lit. m.p. 191°–192°C.). The gold residue from this decomposition weighed 1.2 g.

EXAMPLE G

Preparation of Metallic Gold and 8,8'-Biquinoline From 8-Quinolylgold(I)

A sample of 1.5 g. (4.6 mmoles) of 8-quinolylgold(I) was placed in a sublimator and heated to 210°C. under 0.2 mm. pressure. The crude sublimate weighed 0.5 g. (85 percent yield), m.p. 205°–207°C. After recrystallization from ethanol, the sample had a m.p. of 214°–216°C., lit. m.p. 205°–207°C. The gold residue weighed 1.0 g.

EXAMPLE H

Preparation of Metallic Gold and 6,6'-Biphenanthridine
From 6-Phenanthridinylgold(I)

A 3.0-g. sample of 6-phenanthridinylgold(I) was heated in a sealed glass tube for 4 hours at 320°C. The tube was cooled and opened, and the part of the tube containing the charge was heated at 370°C. in vacuo for 4 hours. Crystalline 6,6'-biphenanthridine, a known compound, m.p. 344°–346°C., sublimed into the cool portion of the tube in 100 percent yield. The residue of metallic gold weighed 1.30 g. (91.5 percent).

EXAMPLE I

Use of 4-t-Butyl-2-Pyridylgold(I) as a Source of Decorative Gold

A decorating solution was prepared by dissolving, in 15 ml. of tetrahydrofuran, 1.0 g. of 4-t-butyl-2-pyridylgold(I), 1.0 g. of a resin obtained by evaporating the solvent from commercial Singapore varnish, and about 0.03 g. of red dye. The solution was brushed onto the rim of a glass. The glass was fired by passing it on a belt slowly through a 10-foot furnace over a period of 45 minutes. The temperature in the center of the furnace was about 600°–650°C. A bright, continuous, well-adhering gold film was formed on the glass.

EXAMPLE J

Preparation of Metallic Gold and 2,2'-Dimethyl-4,4'-Biquinoline From 2-Methyl-4-Quinolylgold(I)

A 3.5-g. sample of the gold compound was placed in a sublimator and heated to 275°C. (oil bath temperature) under a vacuum of 0.1 mm. The sublimed produced weighed 1.4 g. (95 percent yield). An analytical sample, after recrystallization from cyclohexane, had a m.p. of 245°–247°C.

Anal. Calcd. for $C_{20}H_{16}N_2$: C, 84.48; H, 5.67; N, 9.85
Found: C, 84.29; H, 5.57; N, 9.99.

In the nmr spectrum ($CDCl_3$), a doublet (J - 8.0 c.p.s.) occurred at 8.81 p.p.m., a complex multiplets from 7.85 to 7.20 p.p.m., and a sharp singlet at 2.80 p.p.m. These signals were in a ratio of 1:4:3.

The gold residue from the decomposition weighed 2.0 g. (98.5 percent yield).

The embodiments of the invention in which an exclusive property or privilege is claimed are defined as follows:

1. Heterocyclylgold(I) compounds of the formula $$Q - Y - Au$$

wherein:

Q is a monovalent group derived by removal of a hydrogen from a ring carbon of a basic aromatic compound selected from the group consisting of
   pyridine
   quinoline
   benzoquinoline
   isoquinoline
   benzisoquinoline and
   phenanthroline,
said aromatic compound having 0 to 3 substituents, said substituents being either trifluoromethyl or having 1 to 8 carbon atoms and being selected from the group consisting of alkyl, alkoxy, aryl, aryloxy, alkaryl, alkaryloxy, aralkyl and aralkoxy and free of ethylenic and acetylenic unsaturation, provided that no heterocyclic ring in Q has more than one tertiary alkyl substituent; and Y is a link between Q and Au, and is a single bond or a p-phenylene group.

2. A compound of claim 1, wherein Y is a single bond.
3. A compound of claim 1, wherein said substituents are trifluoromethyl or lower alkyl.
4. The compound of claim 1, 2-pyridylgold(I).
5. The compound of claim 1, 2-quinolylgold(I).
6. The compound of claim 1, 8-quinolylgold(I).
7. The compound of claim 1, 3-methyl-2-pyridylgold(I).
8. The compound of claim 1, 4-methyl-2-pyridylgold(I).
9. The compound of claim 1, 5-methyl-2-pyridylgold(I).
10. The compound of claim 1, 6-methyl-2-pyridylylgold(I).
11. The compound of claim 1, 4-t-butylpyridylgold(I).
12. The compound of claim 1, 6-methoxy-8-quinolylgold(I).
13. The compound of claim 1, 4-(2-quinolyl)phenylgold(I).
14. The compound of claim 1, 4,6-dimethyl-2-pyridylgold(I).
15. The compound of claim 1, 6-phenanthridinylgold(I).
16. The compound of claim 1, 5-trifluoromethyl-2-pyridylgold(I).
17. The compound of claim 1, 2-methyl-4-quinolylgold(I).
18. The compound of claim 1, 2,4-dimethyl-7-quinolylgold(I).
19. A compound of claim 1 wherein said aromatic compound has one substituent and wherein said substituent is either methoxy or alkyl having one to four carbon atoms.
20. A method for making heterocyclylgold(I) compounds comprising reacting a compound having the formula $$Q - Y - Li$$

wherein

Q is a monovalent group derived by removal of a hydrogen ring carbon of a basic aromatic compound selected from the group consisting of pyridine, quinoline, benzoquinoline, isoquinoline, benzisoquinoline and phenanthroline, said aromatic compound having 0–3 substituents, said substituents being either trifluoromethyl or having 1 to 8 carbon atoms and being selected from the group consisting of alkyl, alkoxy, aryl, aryloxy, alkaryl, alkaryloxy, aralkyl and aralkoxy and free of ethylenic and acetylenic unsaturation, provided that no heterocyclic ring in Q has more than one tertiary alkyl substituent; and Y is a link between Q and Li, and is a single bond or a ph-phenylene group with a compound of the formula $$(R^1R^2R^3)Z-Au-X$$

wherein:

$R^1$, $R^2$, and $R^3$ are hydrocarbyl groups having from one to 18 carbon atoms free of ethylenic and acetylenic unsaturation;

Z is selected from the group consisting of phosphorous, arsenic, and antimony; and X is chlorine, bromine or iodine.

21. The method of claim 20, wherein the reaction is run at temperatures of between −80°C. to 50°C.
22. The method of claim 20, wherein the reaction is conducted in the presence of an inert organic solvent for the reactants free of Zerewitinoff-active hydrogen.

* * * * *

PO-1050
(5/69)

UNITED STATES PATENT OFFICE
CERTIFICATE OF CORRECTION

Patent No. 3,755,329        Dated August 28, 1973

Inventor(s) Lawrence Graham Vaughan

It is certified that error appears in the above-identified patent and that said Letters Patent are hereby corrected as shown below:

Column 7, line 2 - "EXAMPLE 3" should be centered as a heading on a separate line.

Column 7, line 59 - "additiomal" should read --additional--.

Column 10, line 53 - "temperatUre" should read --temperature--.

Column 16, line 42 (Claim 20) - "ph-phenylene" should read --p-phenylene--.

Column 16, lines 50-51 (Claim 20) - "phosphorous" should read --phosphorus--.

Signed and sealed this 13th day of August 1974.

(SEAL)
Attest:

McCOY M. GIBSON, JR.
Attesting Officer

C. MARSHALL DANN
Commissioner of Patents